United States Patent [19]
Jeng

[11] Patent Number: 5,297,855
[45] Date of Patent: Mar. 29, 1994

[54] BANJO-TYPE AXLE HOUSING

[75] Inventor: Kuan-Jen Jeng, Taipei, Taiwan

[73] Assignee: Dana Corporation, Toledo, Ohio

[21] Appl. No.: 914,787

[22] Filed: Jul. 16, 1992

[51] Int. Cl.$^5$ .............................................. B60B 35/16
[52] U.S. Cl. .................................. 301/124.1; 301/137
[58] Field of Search ................ 301/124.1, 137; 74/607

[56] References Cited

U.S. PATENT DOCUMENTS

| | | |
|---|---|---|
| 1,384,480 | 7/1921 | Murray, Jr. et al. . |
| 1,451,401 | 4/1923 | Murray et al. . |
| 1,516,148 | 11/1924 | Burkhardt . |
| 1,534,605 | 4/1925 | Murray, Jr. et al. . |
| 2,204,287 | 6/1940 | Wilber . |
| 3,015,238 | 1/1962 | Williams . |
| 3,269,214 | 8/1966 | Nagel . |
| 4,068,541 | 1/1978 | Sakamoto et al. . |

FOREIGN PATENT DOCUMENTS 984103  2/1965  United Kingdom ................ 301/137

OTHER PUBLICATIONS

Encyclopedia Of Automobile Structure, 1985 (pp. 95-96).

Primary Examiner—Russell D. Stormer
Attorney, Agent, or Firm—MacMillan, Sobanski & Todd

[57] ABSTRACT

A banjo-type axle housing includes a hollow central member having a pair of hollow tubes extending outwardly therefrom. Forwardly and rearwardly facing openings are formed in the central member, each having triangularly shaped side portions located adjacent to the tubes. In a first embodiment, a pair of triangularly shaped support plates are disposed within the side portions and secured to the central member so as to completely close them. In a second embodiment, a pair of modified baffle plates are provided, each including a central baffle portion having an opening formed therethrough and a pair of triangularly shaped side portions formed integrally with the central baffle portion. The side portions are bent so as to extend generally perpendicular relative to the central baffle portion. The modified baffle plates are secured to the central member of the axle housing and perform the functions of the separate baffle plates and side portions of the first axle housing.

12 Claims, 4 Drawing Sheets

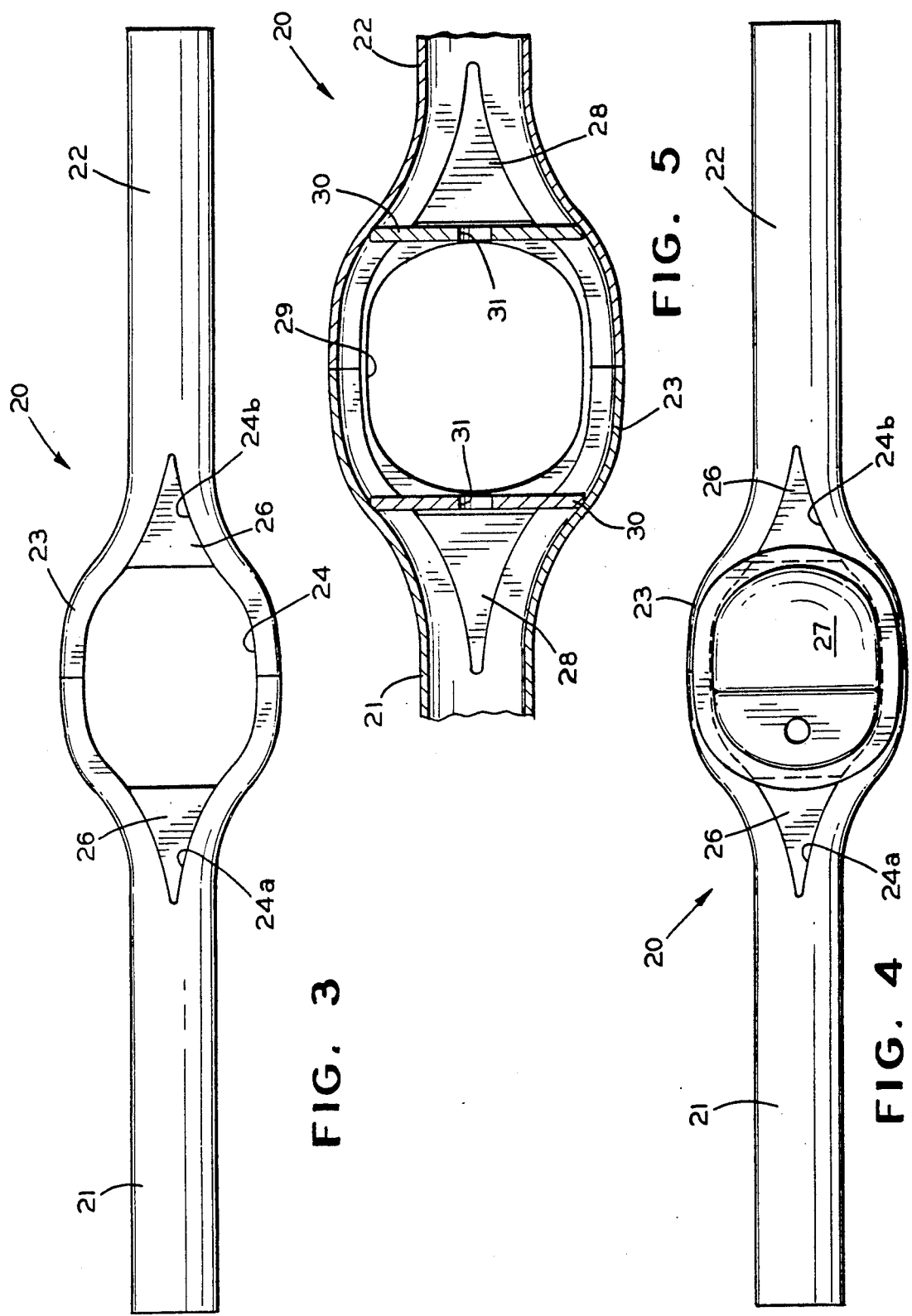

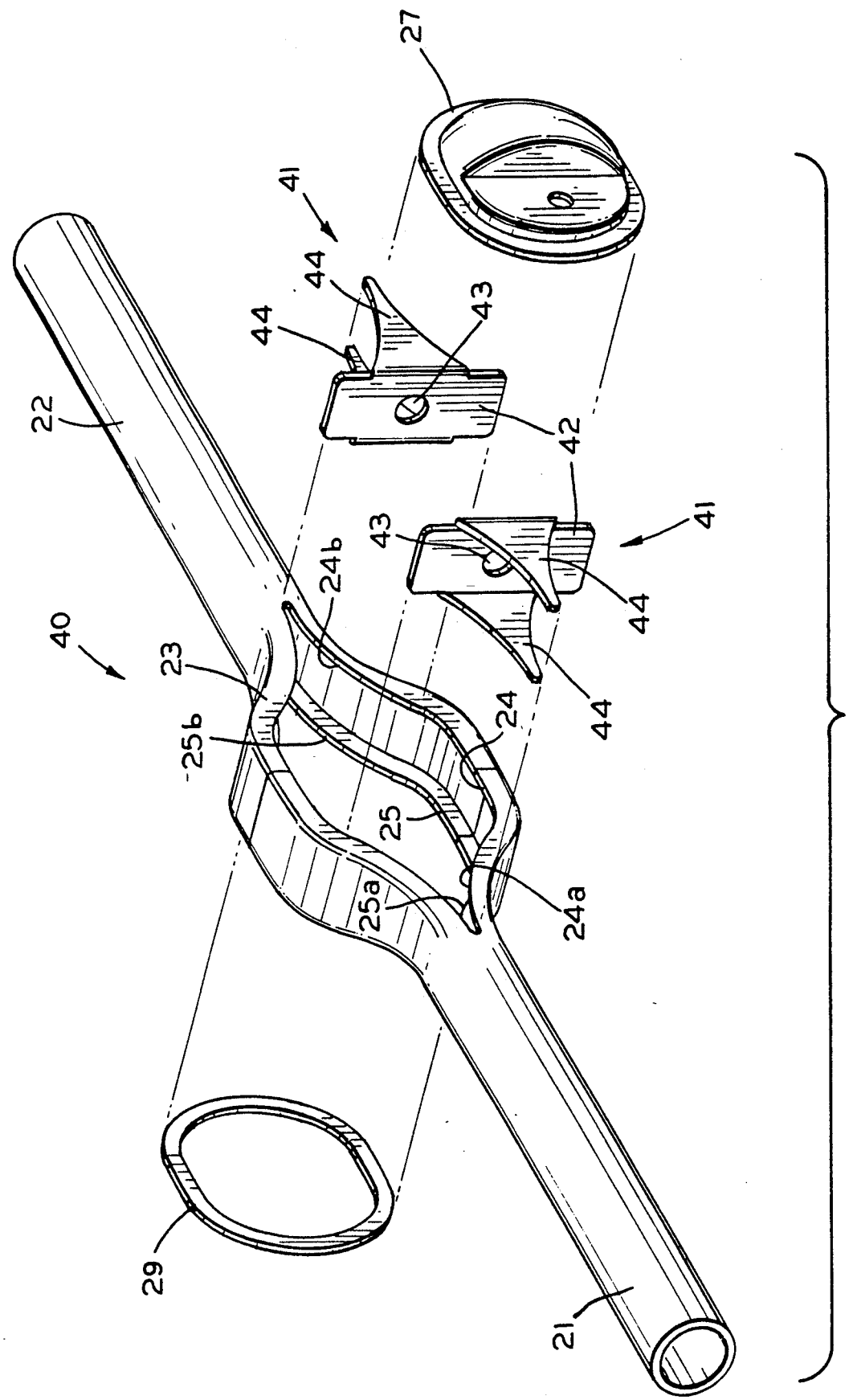

//5,297,855//

BANJO-TYPE AXLE HOUSING

BACKGROUND OF THE INVENTION

This invention relates in general to vehicle axle assemblies and in particular to an improved structure for a banjo-type axle housing.

Axle assemblies are well known structures which are in common use in most vehicles. Such axle assemblies include a number of components which are adapted to transmit rotational power from an engine of the vehicle to the wheels thereof. Typically, an axle assembly includes a differential which is rotatably supported within a non-rotating carrier. The differential is connected between an input drive shaft extending from the vehicle engine and a pair of output axle shafts extending to the vehicle wheels. The axle shafts are contained in respective non-rotating tubes which are secured to the carrier. Thus, rotation of the differential by the drive shaft causes corresponding rotation of the axle shafts. The carrier and the tubes form a housing for these drive train components of the axle assembly, inasmuch as the differential and the axle shafts are supported for rotation therein.

Axle housings are generally classified into two basic types. The first axle housing type is a unitized carrier construction, commonly referred to as a Salisbury or Spicer type axle assembly. In this structure, the carrier (which houses the rotatable differential) is directly connected to the two tubes (which house the rotatable axle shafts). An opening is provided at the rear of the carrier to permit assembly of the differential therein. This opening is closed by a cover during use.

The second axle housing type is a separable carrier construction. In this structure, the axle tubes are connected together by a central member which is formed separate and apart from the carrier. This central member is generally hollow and cylindrical in shape, having a large generally circular opening formed therethrough. During assembly, the differential is first assembled within the carrier, then the carrier is secured to the central member. The overall shape of this type of axle housing (i.e., the generally round shape of the central member and the elongated tubes extending therefrom) generally resembles the shape of a banjo musical instrument. Hence, this type of axle housing is commonly referred to as a banjo-type axle housing. Banjo-type axle housings are advantageous because the carrier and differential can be removed from the axle assembly for service without disturbing the other components thereof.

One known structure for a banjo-type axle housing is formed by splitting one end of each of two tubes, spreading the two split ends apart, and securing the spread ends together to form a hollow cylindrical central member. The central member includes rearwardly and forwardly facing openings. A rear mounting plate and cover are secured over the rearwardly facing opening and a forward mounting plate is secured over the forwardly facing opening. The forward mounting plate includes a generally oval shaped opening which receives a differential and carrier assembly. Typically, a pair of baffle plates are secured within the axle housing central member to cover the interior ends of the axle tubes. The baffle plates have apertures formed therethrough through which the axle shafts extend. The baffle plates function to prevent the splashing of differential lubricant out of the central member into the axle tubes.

The above-described banjo-type axle housing has been in common use for years. However, it has been found that under typical vertical loading conditions, the axle housing develops tensile stresses within the curved portions of the spread apart tube ends which form the central member. These tensile stresses can cause the central member of the axle housing to fracture at or near the curved portions. Thus, it would be desirable to provide an improved structure for a banjo-type axle structure which is resistant to these tensile stresses and, therefore, has a longer useful life. Also, it would be desirable to provide an improved structure for a banjo-type axle housing which is simple and inexpensive in construction.

SUMMARY OF THE INVENTION

This invention relates to an improved structure for a banjo-type axle housing. The housing includes a hollow central member having a pair of hollow tubes extending outwardly therefrom. Forwardly and rearwardly facing openings are formed in the central member. The openings are generally oval in shape, each having respective triangularly shaped side portions located adjacent to the tubes. In a first embodiment of this invention, a pair of triangularly shaped support plates are disposed within the side portions of each of the forwardly and rearwardly facing openings. The support plates are secured, such as by welding, to the central member so as to completely close the triangularly shaped side portions of the opening. A rear cover can be secured to the central member and to the rear support plates to close the rearwardly facing opening. Similarly, a forward mounting plate can be secured to the central member and to the front support plates about the forwardly facing opening.

In a second embodiment of this invention, a pair of modified baffle plates are provided in lieu of the support plates and the baffle plates. Each of the modified baffle plates includes a central baffle portion having an opening formed therethrough. A pair of triangularly shaped side portions are formed integrally with the central baffle portion. The side portions are bent so as to extend generally perpendicular relative to the central baffle portion. The modified baffle plates are secured, such as by welding, to the central member of the axle housing and perform the functions of the separate baffle plates and side portions of the first axle housing.

Various objects and advantages of this invention will become apparent to those skilled in the art from the following detailed description of the preferred embodiments, when read in light of the accompanying drawings.

BRIEF DESCRIPTION OF THE DRAWINGS

FIG. 3 is an elevational view from the rear of the banjo axle housing illustrated in FIG. 2 shown partially assembled.

FIG. 4 is an elevational view from the rear of the banjo axle housing illustrated in FIG. 3 shown fully assembled.

FIG. 5 is a sectional view from the rear of the banjo axle housing taken along line 5—5 of FIG. 2.

FIG. 6 is an exploded perspective view from the rear of a second embodiment of an improved banjo type axle housing in accordance with this invention.

DETAILED DESCRIPTION OF THE PREFERRED EMBODIMENTS

Figure 1:
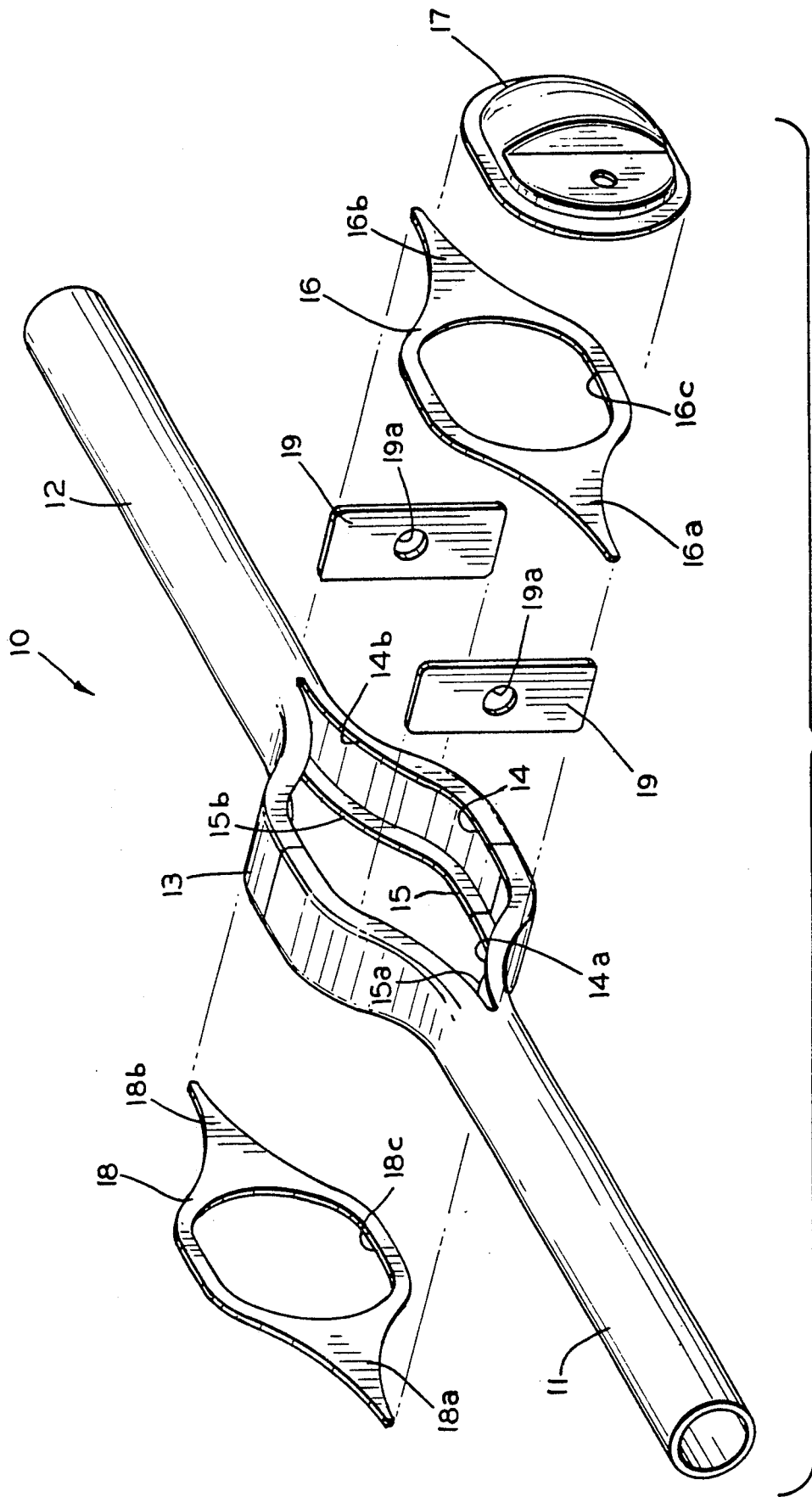
FIG. 1 is an exploded perspective view from the rear of a prior art banjo type axle housing.

Referring now to the drawings, there is illustrated in FIG. 1 an exploded perspective view from the rear of a prior art banjo type axle housing, indicated generally at 10. The prior art banjo housing 10 includes a pair of hollow tubes 11 and 12 and a hollow central member 13. The central member 13 can be formed by splitting one end of each of the two tubes 11 and 12, spreading the split ends apart from one another, and securing the two spread ends together. Typically the ends of the tubes 11 and 12 are secured together by welding. Thus, the central member 13 defines a hollow interior which is adapted to enclose a carrier supporting a rotatable differential (not shown) therein. The tubes 11 and 12 extending outwardly from the central member 13 are adapted to enclose respective rotatable axle shafts (not shown) therein.

The central member 13 has a first opening 14 formed therethrough on its rearwardly facing side and a second opening 15 formed therethrough on its forwardly facing side. The openings 14 and 15 are generally oval in shape. However, the openings 14 and 15 have respective triangularly shaped side portions 14a, 14b and 15a, 15b formed adjacent to the tubes 11 and 12. This configuration is typically provided when the central member 13 is formed in the manner described above.

A rear mounting plate 16 is secured to the rearwardly facing surface of the central member 13, such as by welding, so as to extend completely about the rearwardly facing opening 14. To accomplish this, the rear mounting plate 16 is generally oval in shape, extending over most of the rearwardly facing opening 14. However, the rear mounting plate 16 also includes a pair of outwardly extending side portions 16a and 16b formed integrally therewith. The side portions 16a and 16b are generally triangular in shape. Thus, when the rear mounting plate 16 is secured to the central member 13, the triangularly shaped side portions 16a and 16b extend completely over the triangularly shaped side portions 14a and 14b of the rearwardly facing opening 14. A generally oval shaped opening 16c is formed through the rear mounting plate 16. A generally oval shaped rear cover 17 is secured to the rear mounting plate 16 so as to close the opening 16c formed therethrough.

Similarly, a front mounting plate 18 is secured to the forwardly facing surface of the central member 13, such as by welding, so as to extend completely about the forwardly facing opening 15. To accomplish this, the front mounting plate 18 includes a pair of outwardly extending side portions 18a and 18b formed integrally therewith. The side portions 18a and 18b are generally triangular in shape. Thus, when the front mounting plate 18 is secured to the central member 13, the triangularly shaped side portions 18a and 18b extend completely over the triangularly shaped side portions 15a and 15b of the forwardly facing opening 15. A generally oval shaped opening 18c is formed through the front mounting plate 18. The mounting plate 16 provides a mounting surface for the carrier and other components of the axle assembly mounted within the axle housing 10.

As mentioned above, the central member 13 is adapted to enclose a carrier having a rotatable differential therein. Typically, lubricant is provided within the central member 13 to facilitate rotation of the differential. To prevent such lubricant from escaping from central member 13 into the tubes 11 and 12, a pair of generally rectangularly shaped baffle plates 19 are provided. These baffle plates 19 are typically secured, such as by welding, within the central member 13 to close the interior ends of the tubes 11 and 12 adjacent to the central member 13. However, openings 19a are formed through each of the baffle plates 19. These openings 19a permit the axle shafts to extend therethrough from the central member 13 into the tubes 11 and 12.

Referring now to FIGS. 2 through 5, there is illustrated a first embodiment of an improved banjo type axle housing, indicated generally at 20, in accordance with this invention. As with the prior art banjo housing 10, the banjo housing 20 includes a pair of hollow tubes 21 and 22 and a hollow central member 23. The central member 23 can be formed in the manner described above for the prior art banjo housing 10. Thus, the central member 23 also defines a hollow interior which is adapted to enclose a carrier supporting a rotatable differential (not shown) therein, while the tubes 21 and 22 are adapted to enclose respective rotatable axle shafts (not shown) therein.

The central member 23 has a first opening 24 formed therethrough on its rearwardly facing side and a second opening 25 formed therethrough on its forwardly facing side. The openings 24 and 25 are generally oval in shape, each having respective triangularly shaped side portions 24a, 24b and 25a, 25b adjacent to the tubes 21 and 22. Unlike the prior art axle housing 10, no rear mounting plate is provided on the axle housing 20. Rather, a pair of triangularly shaped rear support plates 26 are provided. The rear support plates 26 are shaped generally in the configuration of the triangularly shaped side portions 24a and 24b of the rearwardly facing opening 24. Thus, as best shown in FIG. 3, the rear support plates 26 can be disposed within such side portions 24a and 24b and be flush with the adjacent outer rearward surfaces of the central member 23.

The rear support plates 26 then are secured, such as by welding, to the central member 23 so as to completely close the triangularly shaped side portions 24a and 24b of the rearwardly facing opening 24. As a result, only a generally oval shaped portion of the rearwardly facing opening 24 remains to be covered. A generally oval shaped rear cover 27 is lastly secured to the central member 23 and to the rear support plates 26 to close the rearwardly facing opening 24 during operation, as shown in FIG. 4. Thus, the rear cover 27 replaces the separate rear mounting plate 16 and rear cover 18 of the prior art axle housing 10.

Figure 2:
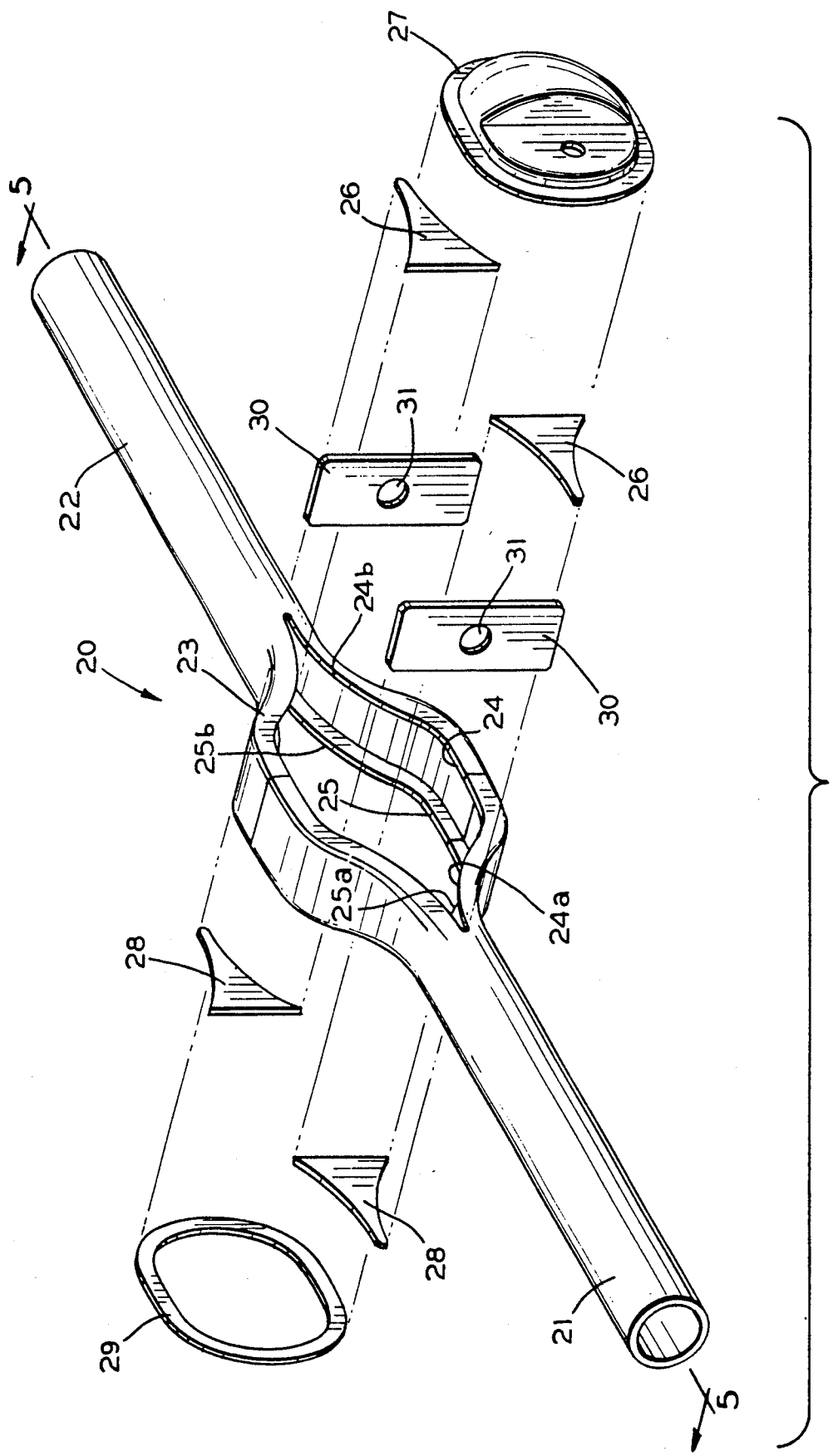
FIG. 2 is an exploded perspective view from the rear of a first embodiment of an improved banjo type axle housing in accordance with this invention.

Similarly, as shown in FIG. 2, a pair of triangularly shaped front support plates 28 are provided for the axle housing 20. The front support plates 28 are shaped generally in the configuration of the triangularly shaped side portions 25a and 25b of the forwardly facing opening 25. Thus, the front support plates 28 can be disposed within such side portions 25a and 25b and be flush with the adjacent outer forward surfaces of the central member 23. The front support plates 28 then are secured, such as by welding, to the central member 23 so as to completely close the triangularly shaped side portions 25a and 25b of the forwardly facing opening 25. As a result, only a generally oval shaped portion of the forwardly facing opening 25 remains to be covered. A generally oval shaped forward mounting plate 29 is secured to the central member 23 and to the front support plates 28 about the forwardly facing opening 25.

As with the prior art axle housing 10, a pair of generally rectangularly shaped baffle plates 30 are provided to prevent lubricant from escaping from central member 23 into the tubes 21 and 22. The baffle plates 30 can be typically secured, such as by welding, within the central member 23 to close the interior ends of the tubes 21 and 22, as best shown in FIG. 5. However, openings 31 are respectively formed through the baffle plates 30. These openings 31 permit the axle shaft to extend therethrough from the central member 23 into the tubes 21 and 22. The baffle plates 30 may also be secured to the support plates 26 and 28, such as by welding.

The support plates 26 and 28 function to add stiffness to the central member 23. As a result, tensile working stresses developed within the central member 23 when the axle housing 20 is subjected to varying vertical loads are significantly reduced. Consequently, the fatigue life of the improved axle housing 20 is greatly extended relative to the fatigue life of the prior art axle housing 10. Additionally, such stiffening of the central member 23 permits the rear cover 27 to be connected directly thereto, instead of being connected to the rear mounting plate 16, as in the prior art axle housing 10. Because the rear support plates 26 provide strength to the improved axle housing 20, the rear cover 27 can be formed from a relatively thin sheet of material. Therefore, the improved axle housing 20 has fewer parts, requires less material, and is easier to assemble than the prior art axle housing 10.

Referring now to FIG. 6, there is illustrated a second embodiment of an improved banjo type axle housing, indicated generally at 40, in accordance with this invention. The second axle housing 40 is similar to the first axle housing 20, and like reference numbers are used to identify similar parts. In the second axle housing 40, two modified baffle plates, indicated generally at 41, are provided in lieu of the support plates 26 and 28 and the baffle plates 30. Each of the modified baffle plates 41 includes a central baffle portion 42 having an opening 43 formed therethrough. A pair of triangularly shaped side portions 44 are formed integrally with the central baffle portion 42. The side portions 44 are bent so as to extend generally perpendicular relative to the central baffle portion 42. The modified baffle plates 41 are secured, such as by welding, to the central member 23 of the axle housing 20. When so secured, the central baffle portions 42 perform the functions of the baffle plates 30 of the first axle housing 20, while the side portions 44 perform the functions of the support plates 26 and 28.

In accordance with the provisions of the patent statues, the principle and mode of operation of this invention have been explained and illustrated in its preferred embodiments. However, it will be understood that this invention may be practiced otherwise than as specifically explained and illustrated without departing from its spirit and scope.

What is claimed is:

1. A baffle plate adapted to be disposed within a central member of an axle assembly, the axle assembly including first and second openings formed therethrough having respective side portions and including first and second hollow tubes extending outwardly therefrom, the baffle plate comprising:
   a central baffle portion adapted to be secured to one of the first and second tubes; and
   a pair of side portions extending generally perpendicular to said central baffle portion, said side portions adapted to be secured to the central member to close the side portions of the openings formed therethrough.

2. The baffle plate defined in claim 1 further including an opening formed through said central baffle portion.

3. An axle housing comprising:
   a hollow central member having a first opening formed through a first surface thereof and a second opening formed through a second surface thereof, each of said first and second openings having a central opening portion and at least one side opening portion;
   a baffle plate including a central baffle portion having first and second side baffle portions extending therefrom, said central baffle portion being disposed within said central member, said first and second side baffle portions being respectively disposed within said side opening portions of said first and second openings and secured to said central member to close said side opening portions; and
   first and second hollow tubes extending outwardly from said central member.

4. The axle housing defined in claim 3 wherein said side opening portions of said first and second openings are disposed adjacent to said first tube.

5. The axle housing defined in claim 3 wherein said baffle plate is secured within said central member to said first tube.

6. The axle housing defined in claim 3 further including a cover secured to said central member to close said first opening.

7. The axle housing defined in claim 3 further including a mounting plate secured to said central member about said second opening.

8. An axle housing comprising:
   a hollow central member having a first opening formed through a first surface thereof and a second opening formed through a second surface thereof, each of said first and second openings having a central opening portion and first and second side opening portions;
   a first baffle plate including a central baffle portion having first and second side baffle portions extending therefrom, said central baffle portion of said first baffle plate being disposed within said central member, said first and second side baffle portions of said first baffle plate being respectively disposed within said first side opening portions of said first and second openings and secured to said central member to close said first side opening portions;
   a second baffle plate including a central baffle portion having first and second side baffle portions extending therefrom, said central baffle portion of said second baffle plate being disposed within said central member, said first and second side baffle portions of said second baffle plate being respectively disposed within said second side opening portions of said first and second openings and secured to said central member to close said second side opening portions; and
   first and second hollow tubes extending outwardly from said central member.

9. The axle housing defined in claim 8 wherein said first side opening portions of said first and second openings are disposed adjacent to said first tube and wherein said second side opening portions of said first and second openings are disposed adjacent to said second tube.

10. The axle housing defined in claim 8 wherein said first baffle plate is secured within said central member to said first tube and wherein said second baffle plate is secured within said central member to said second tube.

11. The axle housing defined in claim 8 further including a cover secured to said central member to close said first opening.

12. The axle housing defined in claim 8 further including a mounting plate secured to said central member about said second opening.

* * * * *